(12) United States Patent
Herrin et al.

(10) Patent No.: US 7,437,333 B1
(45) Date of Patent: Oct. 14, 2008

(54) METHOD AND SYSTEM FOR PROVIDING AN ENERGY COST ESTIMATION FOR A WATER DISTRIBUTION NETWORK

(76) Inventors: Gregg A. Herrin, 192 Deer Run, Burlington, CT (US) 06013; Benjamin D. Wilson, 28 Village Dr., Apt. 8, Keene, NH (US) 03431

( * ) Notice: Subject to any disclaimer, the term of this patent is extended or adjusted under 35 U.S.C. 154(b) by 772 days.

(21) Appl. No.: 10/170,253

(22) Filed: Jun. 12, 2002

(51) Int. Cl.
G01R 11/56 (2006.01)
G01R 21/133 (2006.01)
G06F 17/00 (2006.01)
G06G 7/48 (2006.01)
G06G 7/50 (2006.01)

(52) U.S. Cl. .................... 705/412; 703/9; 703/10
(58) Field of Classification Search ......... 705/412–413; 703/9–10
See application file for complete search history.

(56) References Cited

U.S. PATENT DOCUMENTS

| | | | |
|---|---|---|---|
| 5,511,188 A | 4/1996 | Pascucci et al. | |
| 5,758,347 A | 5/1998 | Lo et al. | |
| 5,787,283 A | 7/1998 | Chin et al. | |
| 6,119,125 A | 9/2000 | Gloudeman et al. | |
| 6,178,393 B1 * | 1/2001 | Irvin | 703/10 |
| 6,247,019 B1 | 6/2001 | Davies | |
| 6,662,146 B1 * | 12/2003 | Watts | 703/10 |
| 6,701,223 B1 * | 3/2004 | Rachford et al. | 700/301 |
| 2002/0083778 A1 * | 7/2002 | Hamilton | 73/861.78 |
| 2003/0009401 A1 * | 1/2003 | Ellis | 705/35 |
| 2003/0074110 A1 * | 4/2003 | Silverman et al. | 700/295 |
| 2003/0093236 A1 * | 5/2003 | Wu et al. | 702/85 |
| 2004/0139038 A1 * | 7/2004 | Ehlers et al. | 705/412 |

FOREIGN PATENT DOCUMENTS

JP    04278608 A  * 10/1992

OTHER PUBLICATIONS

Wu, Ming-Daw, "Interfacing demand and supply uncertainities in municipal water supply management", Utah State University, 1989, pp. 190.*
Boulos, Paul F. and Don J. Wood, Explicit Calculation of Pipe-Network Parameters, Journal of Hydraulic Engineering, vol. 116, No. 11, Nov. 1990, pp. 1329-1344.

* cited by examiner

Primary Examiner—John W Hayes
Assistant Examiner—Fadey S Jabr
(74) Attorney, Agent, or Firm—Cesari and McKenna LLP

(57) ABSTRACT

A method and system for providing cost estimation in connection with a water distribution network is provided. The method includes estimating the energy cost within a water distribution network associated with pumps pushing water from areas of low hydraulic grade to areas of higher hydraulic grade and using energy in the process, as well as estimating cost equivalents for storage changes that occur as tanks within the system fill or drain. The costs associated with this energy are taking into account. Energy Price Definitions are created that take into account the water utility rate structure for the associated pump and the times are which the pump is operating. The price of energy at the pertinent times is taken into account in an energy cost manager program that interfaces with a database of information about the water distribution network as well as utility rate structures from which can be drawn utility rate information to estimate the electrical energy costs for running the system during a particular simulation. The simulation also takes into account peak periods for the electrical energy usage, and normalizes costs to a common time frame.

20 Claims, 8 Drawing Sheets

Energy Costs

| | Prices | Close | Help | | | |
|---|---|---|---|---|---|---|

400

402

404 — Year 2000 Conditions ▽ GO

| | Daily Cost [$] | Usage Cost [$] |
|---|---|---|
| Year 2000 Conditions | | |
| Pump Usage | 118.15 | 79.00 |
| Time Details | 215.93 | 215.93 |
| PMP-343 | 215.93 | 215.93 |
| PMP-345 | 93.38 | 93.38 |
| Storage | 122.55 | 122.55 |
| | -136.93 | -136.93 |
| Peak Demands | 39.15 | |

420

Results

<Peak Demand>

| Label | Peak Power [Hp] | Demand Charge [$/kW] | Demand Charge Period [day] | Peak Power Cost [$] | Daily Peak Power Cost [$] |
|---|---|---|---|---|---|
| PMP-343 | 92.67 | 5.00 | 30 | 345.45 | 11.52 |
| PMP-345 | 151.61 | 22.00 | 90 | 2,486.77 | 27.63 |

FIG. 4

Energy Costs

[ Prices ]  [ Close ]  [ Help ]

☐ Year 2000 Conditions  ▽  |GO|  — 704

| | Daily Cost [$] | Usage Cost [$] |
|---|---|---|
| Year 2000 Conditions | 118.15 | 79.00 |
| Pump Usage | 215.93 | 215.93 |
| Time Details | 215.93 | 215.93 |
| PMP-343 | 93.38 | 93.38 |
| PMP-345 | 122.55 | 122.55 |
| Storage | -136.93 | -136.93 |
| Peak Demands | 39.15 | |

706

Pump | Tank | Summary

| Label | Value | Unit |
|---|---|---|
| Analysis Duration | 24.00 | hr |
| Pump Energy Used | 3,270,967.07 | kWh |
| Volume Pumped | 352,967.07 | ft³ |
| Volume Stored | 223,838.00 | ft³ |
| Volume Unit Price | 0.0000817797 | $/gal |
| Pump Cost | 215.93 | $ |
| Storage Cost | -136.93 | $ |
| Usage Cost | 79.00 | $ |
| Energy Usage Daily Cost | 79.00 | $ |
| Peak Demand Daily Cost | 39.15 | $ |
| Total Daily Cost | 118.15 $ | |

FIG. 7

METHOD AND SYSTEM FOR PROVIDING AN ENERGY COST ESTIMATION FOR A WATER DISTRIBUTION NETWORK

BACKGROUND OF THE INVENTION

1. Field of the Invention

This invention relates generally to engineering modeling and design of water distribution systems, and more particularly, to software tools for estimating the costs associated with such systems.

2. Background Information

Water distribution systems represent an important investment on the part of a water utility, and a critical aspect of the infrastructure of a community. Software used as a tool for the optimal design of a water distribution system allows a company to make intelligent decisions on the investment, new construction, or rehabilitation of a system. The cost of construction, and operation, of a water distribution system is undoubtedly an important factor in planning for the provision of sufficient water supply for a community, not only at the current time, but also over a reasonable future-planning horizon. Software tools can allow an engineer to calculate a planning level estimate of the costs associated with an entire system or a portion of the system. This makes it easier to compare the costs associated with various scenarios, thus helping to ensure that the most cost-effective design and ultimate operation is chosen.

A substantial, non-construction cost in the operation of a water distribution system is that of the electrical energy to be utilized by the system. For example, the cost of operating the pumps during an extended period is an important item of information to be taken into account. This energy is an additional consideration in a cost analysis.

Conventionally, energy cost analyses have not been complete. For example, if an engineer includes a tank in a proposed network that has an initial water tank level for a particular day of ten feet of water and, during the course of the simulation, the water level falls to five feet, then this event translates into an energy loss, because at some point the pump will have to expand energy to refill the tank back to its original level. Conversely, if the water level in a tank at the end of a simulation is greater than the initial level, then that should be taken into account in the cost associated with the refilled tank. In other words, a cost analysis and/or cost estimate should not be based solely on the costs of running a pump, but should include storage considerations.

Up to now, these considerations have not been taken into account in known water distribution network software. For instance, if a pump is off for an extended period simulation in which a tank meets the demand of a network for a twenty-four hour period without requiring additional water, and a cost analysis is run without accounting for storage gains and losses for that twenty-four hour period, then a typical program would calculate the daily energy cost for that network as zero, as if the pumps did not run, and no energy was consumed. This is obviously incorrect, as energy will be required afterwards to refill the tank to account for the usage during the previous day.

Moreover, the energy cost pricing structure of the utility can include a number of different factors. More specifically, there are two parts to the energy cost, a usage charge and a peak demand charge (also known as a ratchet charge). The "usage cost" is a direct cost related to the amount of energy used (e.g., XkWh at Y cents per kWh), where the unit cost per kWh may vary over the course of the day. For example, there may be high rates during the day when usage is higher, and low rates during the night when usage is lower. The "demand charge" is an additional cost which is related to the peak power that is used (power is energy/time), and reflects the need for the electrical utility to provide energy at a certain peak rate to meet a peak demand (even if that peak rate is only needed for a few minutes).

Each utility has its own billing structure for power used, and residential usage rates usually are different than industrial usage rates. Many industrial usage rate structures can be rather complex. And yet, known water distribution network modeling systems do not typically take into account the total energy cost during a particular time based on the relevant rate structure, including the billing cycle.

There remains a need, therefore, for a water distribution network energy cost estimation system, which takes into account storage levels and related considerations.

There remains a further need for a water distribution network cost estimation system, which also includes electrical utility rate structure information and pricing information to be taken into account that is mapped to the relevant time period of the simulation.

It is an object of the present invention to provide a software tool for modeling and designing a water distribution system that incorporates energy cost estimation that includes the cost of energy usage, the cost of refilling of storage tanks, and utility rate structures to provide a more accurate estimate of the energy costs associated with the operation of the system being designed, or operated, and a more accurate basis for comparing the costs associated with one trial solution versus the cost associated with a different proposed trial solution, for example.

SUMMARY OF THE INVENTION

The disadvantages of prior techniques are overcome by the present invention that provides a method for engineers to estimate the energy cost associated with the operation of a water distribution network. The method includes assigning an energy price to each particular time step being analyzed and using that assigned energy price when calculating costs for that particular time step. In this manner, costs are normalized to a common time frame. The method further incorporates storage cost information, and energy costs associated with pumps pushing water from areas of low hydraulic grade to areas of higher hydraulic grade, using energy in the process. This energy has an associated cost and this costs can have a significant impact on the overall energy usage and cost of maintaining the system.

The software application program of the invention includes an energy cost manager, which works with a hydraulic network solver engine. Information regarding relevant utility rate structures may be entered by the user. In accordance with the method of the present invention, the electrical cost of running the system during a particular simulation period depends, for example, on whether the simulation relates to a peak period for electrical energy usage.

The energy cost manager includes an analysis control dialogue, which allows the user to select a scenario to be simulated. Pumps and other components in the systems are identified and the user can choose an energy pricing definition that is to be used when calculating the corresponding pump energy prices. The costs are then calculated, or estimated for the selected time period. Detailed results are produced and can be displayed in the desired manner for the user, providing a breakdown of the calculated costs associated with various items in the energy cost analysis. For example, a tank table lists all tanks in the scenario and the storage volumes for that tank during beginning and end of the simulation period. A pump usage page allows a daily energy usage or total energy usage result to be displayed for each pump. A time detail page contains a report containing the calculated results. A graph tab allows a graph to be printed, which plots the price against time. A page entitled peak demands can be generated which provides information about peak demand over the course of a day. A user is able to select these pages to best suit his/her project needs. From the information thereby obtained, the user can make decisions about the design of a new system or portion of a system, or about the operation of a system, and the costs associated therewith.

BRIEF DESCRIPTION OF THE DRAWINGS

The invention description below refers to the accompanying drawings, of which:

FIG. 4 is a schematic illustration of the GUI regarding peak demand charges in accordance with the present invention;

FIG. 7 is a schematic illustration of a GUI of a system cost summary; and

DETAILED DESCRIPTION OF AN ILLUSTRATIVE EMBODIMENT

Figure 1:
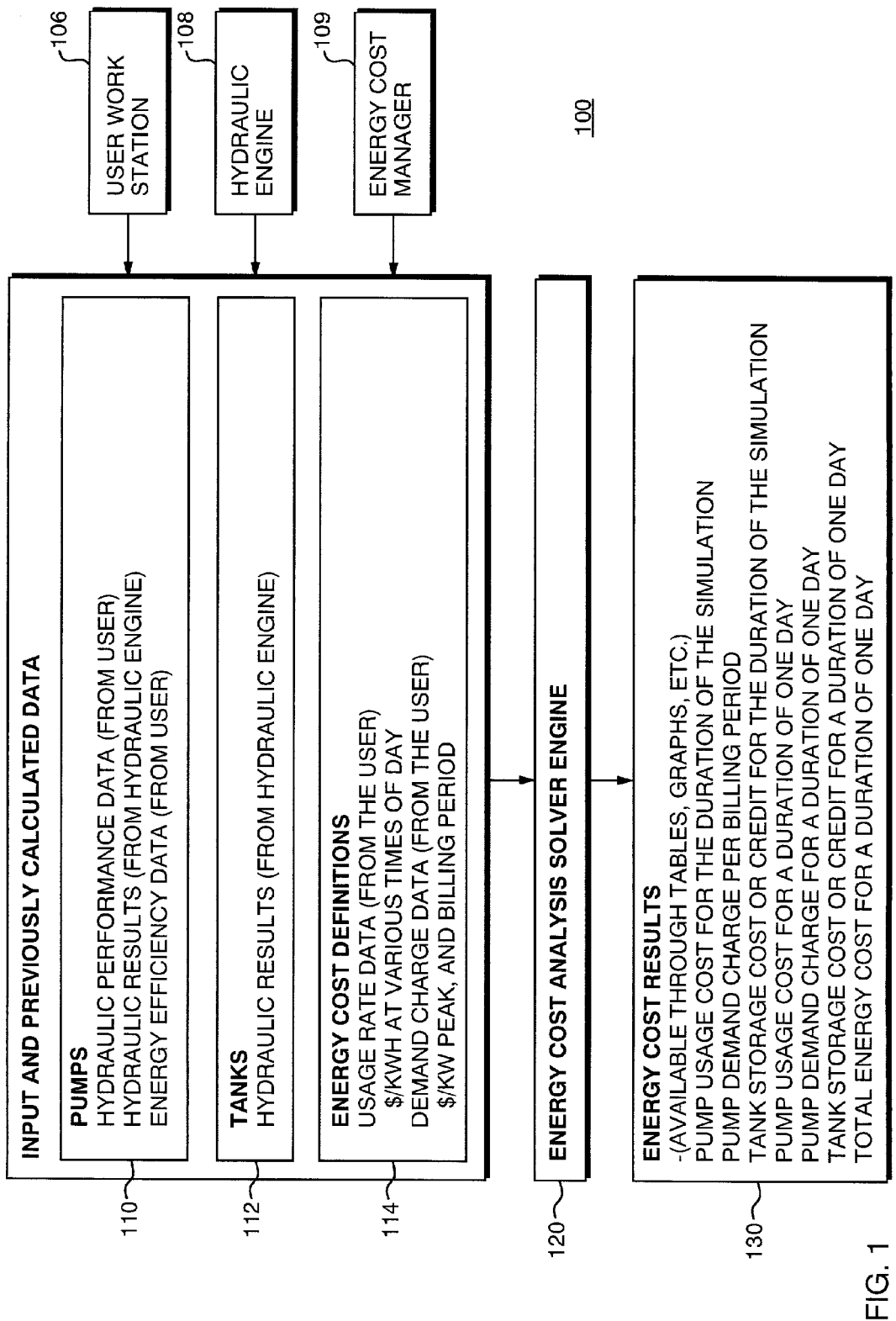
FIG. 1 is a schematic block diagram of the energy cost manager of the present invention.

FIG. 1 illustrates a system 100 for providing an energy cost estimation for a water distribution network. The water distribution network includes a number of components such as pipes, pumps and water storage tanks that comprise the infrastructure of the water distribution network. A water distribution network modeling system is a software program that is used as a tool to design and analyze complex hydraulic networks such as pressurized piping systems. The program allows for a user on a personal computer or other workstation 106 to enter data for use in calculations and estimations. The water distribution network modeling program also includes multiple graphical user interfaces discussed in further detail herein which provide a user friendly manner of quickly laying out a complex network of pipes, tanks, pumps and other components used in the water distribution system. The system of the present invention includes a software program, which contains a hydraulic solver engine 108, which uses the data entered by the user and other calculations about the water distribution model to calculate results and parameters, to describe real world system behavior and to predict model system behavior.

In accordance with the present invention, the system 100 includes an energy cost manager 109, which utilizes information about pumps illustrated in information block 110 and that information includes hydraulic performance data which is input by the user (106), hydraulic results data is developed by the hydraulic network solving engine 108 and energy efficiency data which would be input by the user (106). The energy cost manager 109 also utilizes information about water storage tanks such as that shown in information block 112. Hydraulic results about the water storage tanks will be produced by the hydraulic network solver engine 108. The other inputs to the system are illustrated in information block 114, which show energy cost definitions which can be constructed by the user using the energy pricing editor as discussed in further detail herein. However, as illustrated in block 114, the energy cost definitions will take into account usage rate data from the user (which is typically in dollars per kilowatt hour) at various times of the day and demand charge data which is dollars per kilowatt peak time for the billing period.

The inputs from information blocks 110, 112 and 114 are inputs to the energy cost analysis solver engine 120 of the present invention. The solver engine 120 calculates the energy cost estimations for the water distribution network and produces energy cost results illustrated in block 130. The energy cost results 130, which are available through tables, graphs and the like include: pump usage cost for the duration of the simulation, pump demand charge per billing period, tank storage cost or credit for the duration of the simulation, pump usage cost for a duration of one day, pump demand charge for a duration of one day, tank storage cost or credit for duration of one day and total energy cost for a duration of one day. Other results could be produced by the energy cost analysis solver engine 120 while remaining within the scope of the present invention.

In accordance with the present invention, the energy cost manager 109 allows a user to estimate the costs of operating the pumps during a simulation of system operation. For purposes of illustration, we will consider an example of cost estimation for a system, which includes two pumps and one storage tank. As will be understood by those skilled in the art, systems containing many pumps and other components may be analyzed within the scope of the present invention.

Using the energy cost manager 109, the user may construct an Energy Cost Definition 114. An Energy Cost Definition 114, in accordance with the invention, is a set of prices for electrical energy that apply to a pump (or other component) at a predetermined time interval. In the illustrative embodiment, the time interval is one day. However, the time interval may be one week, bi-weekly, one year, or another time interval. An energy price is assigned for that particular time interval. As discussed in further detail below, the energy costs are calculated so that the results refer to this common time frame.

More specifically, suppose that each pump is associated with a different electrical provide or a different billing program. For example, the pumps may be widely dispersed on an electrical grid so that different energy providers are associated with pumps in different locations. This information is taken into account by the energy cost manager of the present invention, but it must be entered into the system.

Figure 2:
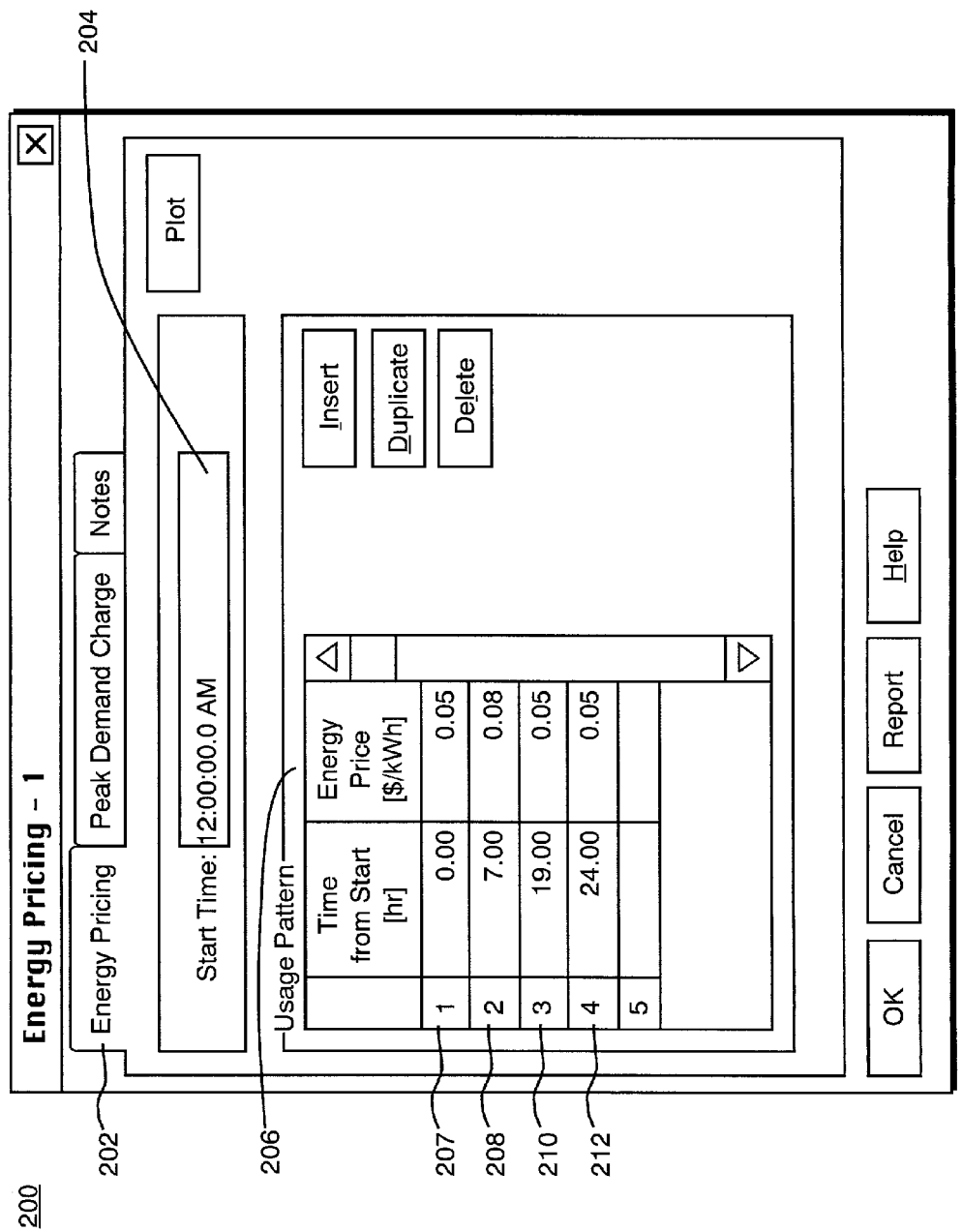
FIG. 2 is a schematic illustration of a graphic user interface (GUI) relating to daily price pattern for one energy cost definition in accordance with the present invention.

In order to enter this kind of information into the system 100 the energy cost manager 109 includes a user interface 200 as illustrated in FIG. 2. As will be understood by those skilled in the art, the user interface 200 includes an Energy Pricing tab 202, which opens the energy pricing manager of the energy cost manager software 109 (FIG. 1). The energy pricing software allows the user to enter a Start Time in window 204 for the energy pricing information. In the example, the Start Time is 12:00 am (midnight). The user next takes known data, about the daily pricing structure at predetermined points in time, and uses the table 206 to enter this information. For example, in the Usage Pattern window 206, the initial entry 207 includes the Time from Start, which is 0.00 hours, and the Energy Price in dollars per kilowatt-hour, at that time, which is then entered by the user, is 0.05 $/kWh. The second time 208 is 7.00 hours from start, at which time the energy price is 0.08 $/kWh. The next entry 210 is 19.00 hours from start which would be later in the evening, after peak usage time, so that the price returns to 0.05 $/kWh. The final time in the example is 24.00 as shown in window 212. In other words, the direct energy cost between the hours of 7 am and 7 pm is 8 cents per kilowatt-hour, and from 7 pm to 7 am the price is 5 cents per kilowatt-hour.

The user can employ the interface 200 to introduce this information into the system about the prices of the energy at various time steps in the definition. Thus, in accordance with the invention, the user can assign an energy price to each particular time step and use that assigned energy price when calculating estimates for that particular time step.

Figure 3:
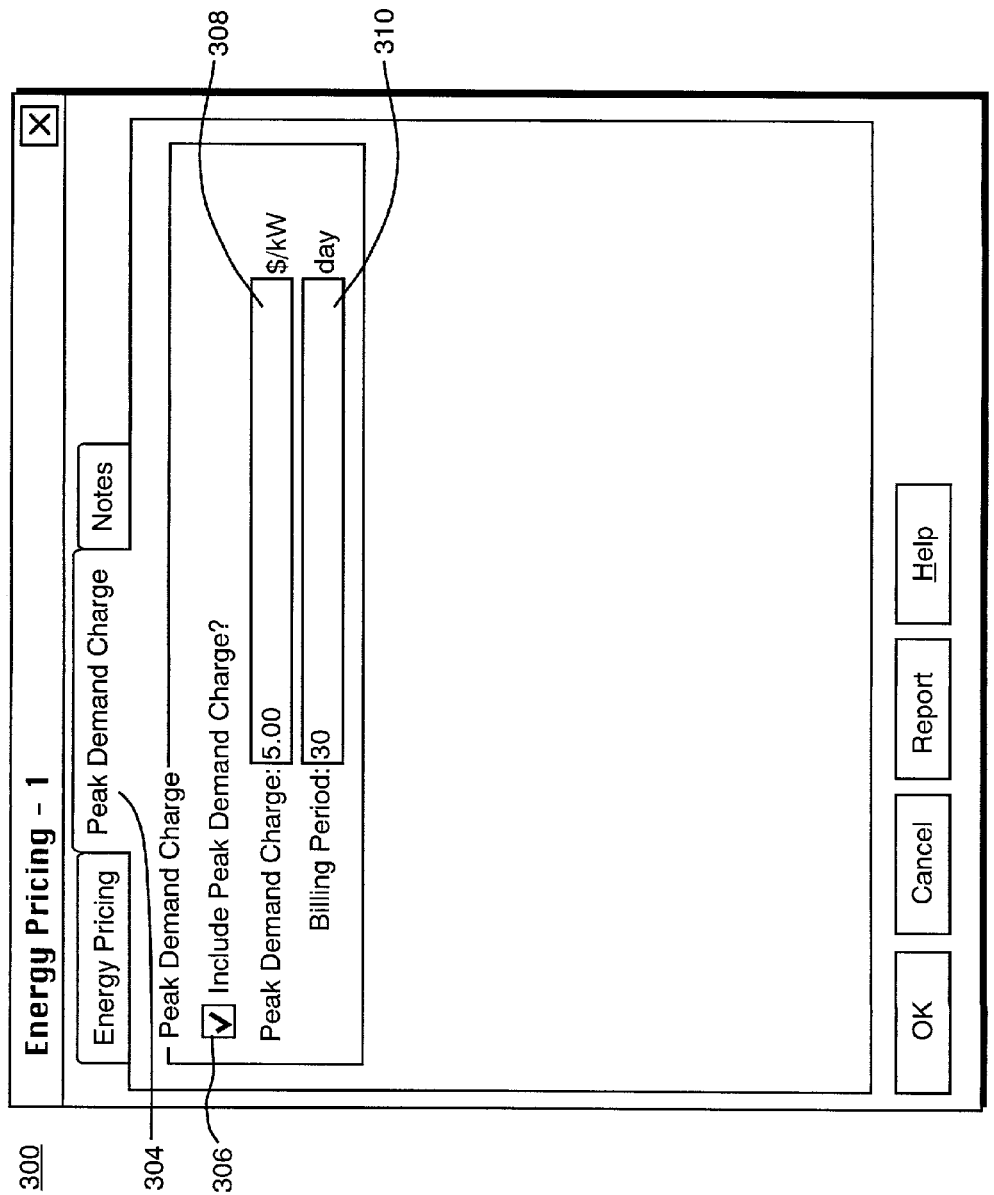
FIG. 3 is a schematic illustration of a GUI of a peak demand description in accordance with the present invention.

Next, the user may enter information about peak demand charges as illustrated in GUI 300 of FIG. 3. In this case, the user selects the Peak Demand Charge tab 304 and can use the check box 306 to include the peak demand charge in the calculations. The peak demand is defined as the demand for power during the period of greatest power usage. This would probably occur when the pump is actively operating to transport water within the distribution system. The user enters the peak demand charge in the example of $5.00 per kilowatt over a 30-day billing period, as illustrated in windows 308, 310. Thus, this information can be introduced into the calculations using this interface.

Once the pricing information has been entered, the system of the present invention calculates the energy costs for the components of the system for a particular scenario. The costs have three components: the average daily energy cost (or an equivalent daily cost), the peak demand cost normalized to a daily figure, and the storage cost/credit, where applicable. But, initially, the user selects a scenario to be simulated.

More specifically, in the GUI 400 of FIG. 4, there is an analysis control pane 404 that includes a pull-down menu, which allows the user to select the scenario for the estimation. As noted herein, the energy cost manager 109 works in tandem with a hydraulic modeling system, and a hydraulic solver engine 108. The hydraulic modeling system allows for different alternatives to be selected to create a scenario. Once a scenario is constructed from the user selected alternatives, the solver engine runs a simulation of the modeled system in operation. One example of a system for performing the construction of a scenario is described in a commonly-owned U.S. Pat. No. 7,107,280 entitled METHOD AND SYSTEM FOR THE STORAGE AND USE OF ENGINEERING MODELING ALTERNATIVES WITH UNITIZED DATA, filed on May 14, 2002.

Alternative scenarios allow the user to calculate multiple "What If?" situations in a single project file. The user may wish to try several designs and compare the results or analyze an existing system using several different demand alternatives to then compare the results obtained and system pressures, costs and the like. In the present invention, the energy costs are estimated for the scenario being simulated. As shown in FIG. 4, the scenario selected is: Year 2000 conditions, 404, which are the average conditions during an average day in the year 2000. First, with respect to daily cost, the Year 2000 conditions yielded a daily cost of $118.15, with a usage cost of $79.00. This was obtained by calculating the cost associated with each component. More specifically, there are two pumps in the exemplary system: PMP-343 and PMP-345. The energy usage per day is determined for each, where the daily cost of operating PMP-343 was $93.38 and the daily cost of operating PMP-345 was $122.55. The "Daily Cost" is a value that has been normalized to a cost based on a 24-hour period. For example, the total cost divided by the number of days observed. The "Usage Cost" is the total cost incurred over the course of the simulation period, In this case, the analysis period was 24 hours, so the values are the same. Next, the tank storage costs are also to be included. As illustrated in FIG. 4, this is a negative cost quantity of −136.93. This is actually a credit, which has been introduced into the analysis to account for the fact that the storage tank contains more water at the end of the simulation than it had at the beginning of the simulation. Therefore, a credit for that cost has been introduced into the analysis to more accurately reflect the cost savings due to the water storage volume change for that tank.

More specifically, the starting point of the tank is a reference point to measure gained or lost volume. If the tank ends up more full than when it starts, a "credit" (a negative cost) is applied because the pumps pushed more water into that tank that they needed to in order to break even. To calculate the average daily cost, the objective is not to fill each tank completely, but to get back to where the calculation started.

In addition to daily cost and storage cost/credit, peak demand costs are also calculated. Also illustrated in FIG. 4 are the peak demand charges for operating each pump. For the pump PMP-343, the peak power in horsepower was 92.67 and the demand charge in dollars per kilowatt was $5.00. The demand charge period was estimated over a 30-day period so that the peak power cost for the thirty days was calculated to be $345.45. It is noted that horsepower and kilowatts are both units of power. The peak power that the pump uses is the peak power used for the demand charge. The results for the pump PMP-345 are also illustrated. Pump PMP-345 is a pump that runs at a higher cost than pump PMP-343 because it moves a larger volume of water or operates at a higher speed or otherwise draws more power than the other pump. A user can readily see this information by viewing the results pane 420 and can thereby determine whether one of the pumps should be replaced by a pump which operates at a different speed, or perhaps that a pump should be operated only during non-peak hours because of its higher power demands.

Figure 5:
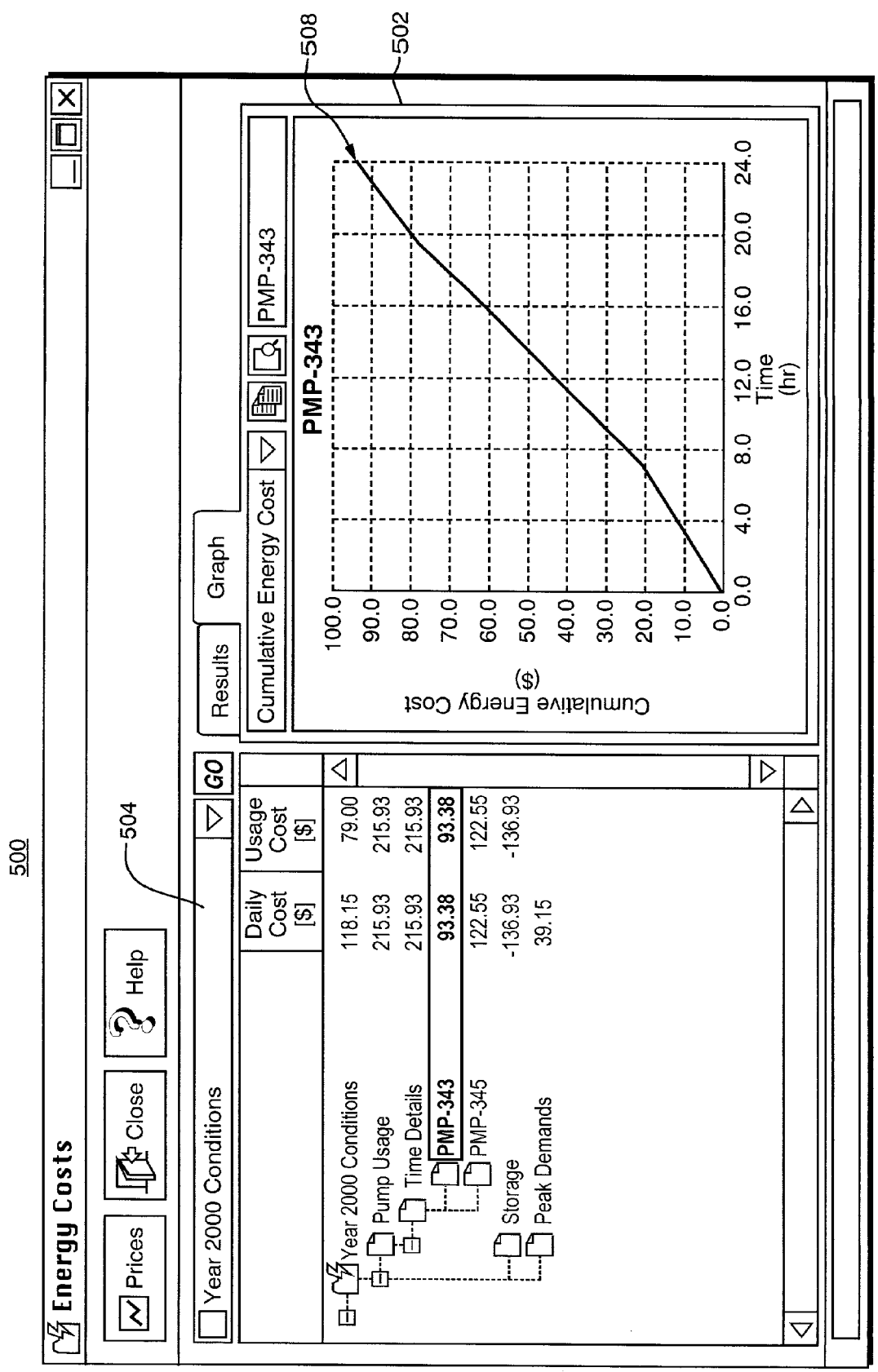
FIG. 5 is a schematic illustration of a GUI of a graph of the cumulative energy cost for an individual pump.

The energy cost manager 109 also allows a user to graph the information for a visual illustration of the cumulative energy cost over time for a particular component. This is illustrated in the user interface 500 of FIG. 5. The graph 502 illustrates the cumulative energy cost in dollars over a 24-hour period (plotted along the x-axis) for the pump PMP-345. As discussed with respect to FIG. 2, the pump PMP-343 had a usage cost of 93.38, which can be seen on the graph at the 24-hour period mark as illustrated at point 508 in FIG. 5.

Figure 6:
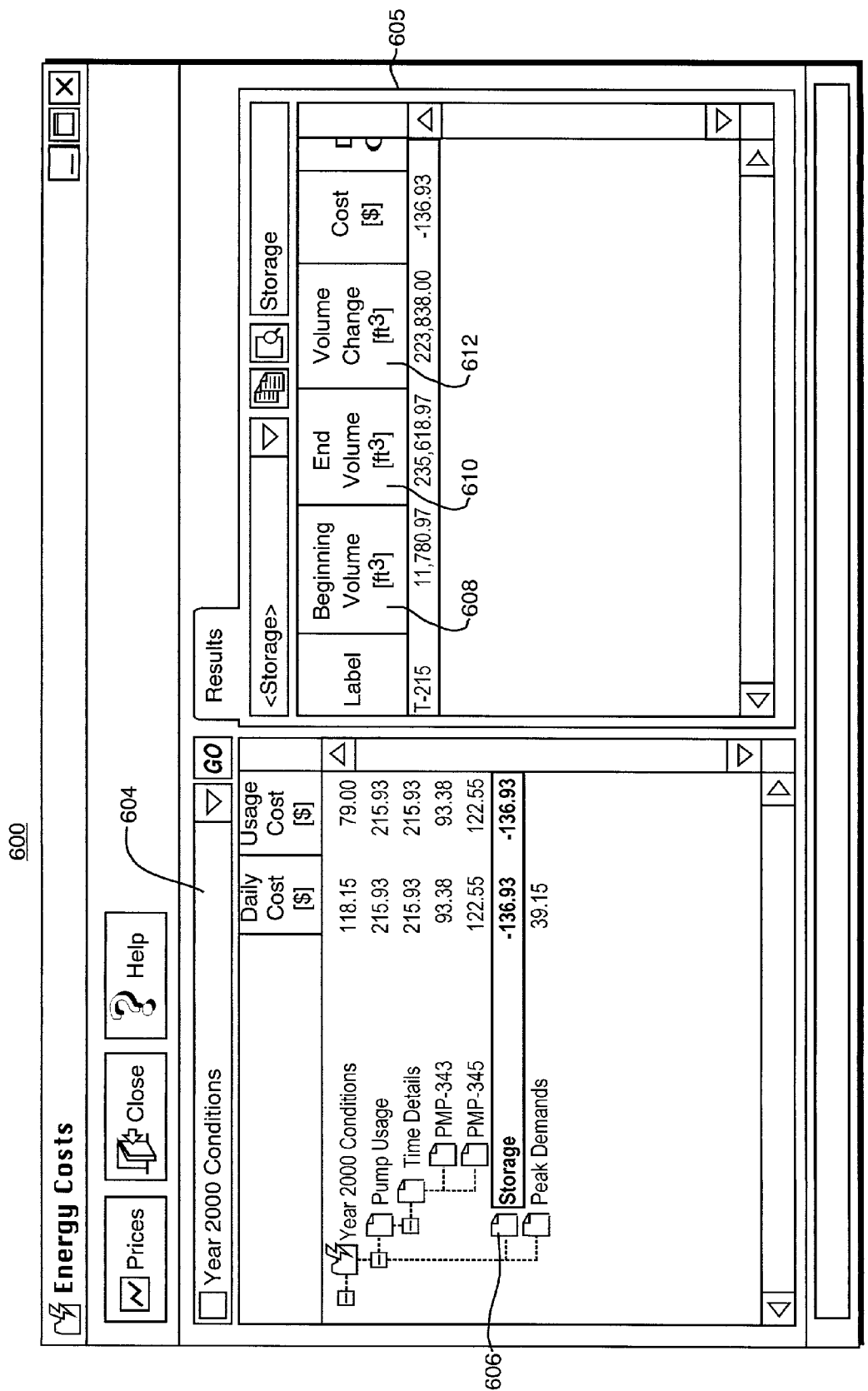
FIG. 6 is a schematic illustration of a GUI of the storage cost summary aspect of the present invention.

FIG. 6 illustrates a screen shot of a cost summary for the storage tank T-215. The user interface 600 illustrates that the scenario selected is the year 2000 conditions 604. The storage tank T-215 has been credited with the daily cost of −136.93 because it had a beginning volume of 11,780.97 feet$^3$ as illustrated at the tab 608. The ending volume of 235,618.97 feet$^3$ (610) yields a volume change of 223,838.00 feet$^3$ (612). Thus, the net effect was that the tank was filled. This allows a credit to be placed against the cost analysis because this amount was added to the tank and therefore would not have to be utilized to refill the tank to that volume.

An overall cost summary is listed in the GUI 700 of FIG. 7. FIG. 7 illustrates the duration of the analysis being 24-hours, the pump energy used which is 3,270.45 kilowatt hours, the volume pumped and the volume stored are illustrated as well as the volume/unit price in dollars-per-gallon. This resulted in a total pump cost of $215.93 (adding the daily cost of each pump), but there is also a storage credit of −136.93 for the day. The peak demand daily cost is 39.15 is then added to that amount resulting in a total daily cost of 118.15.

Figure 8:
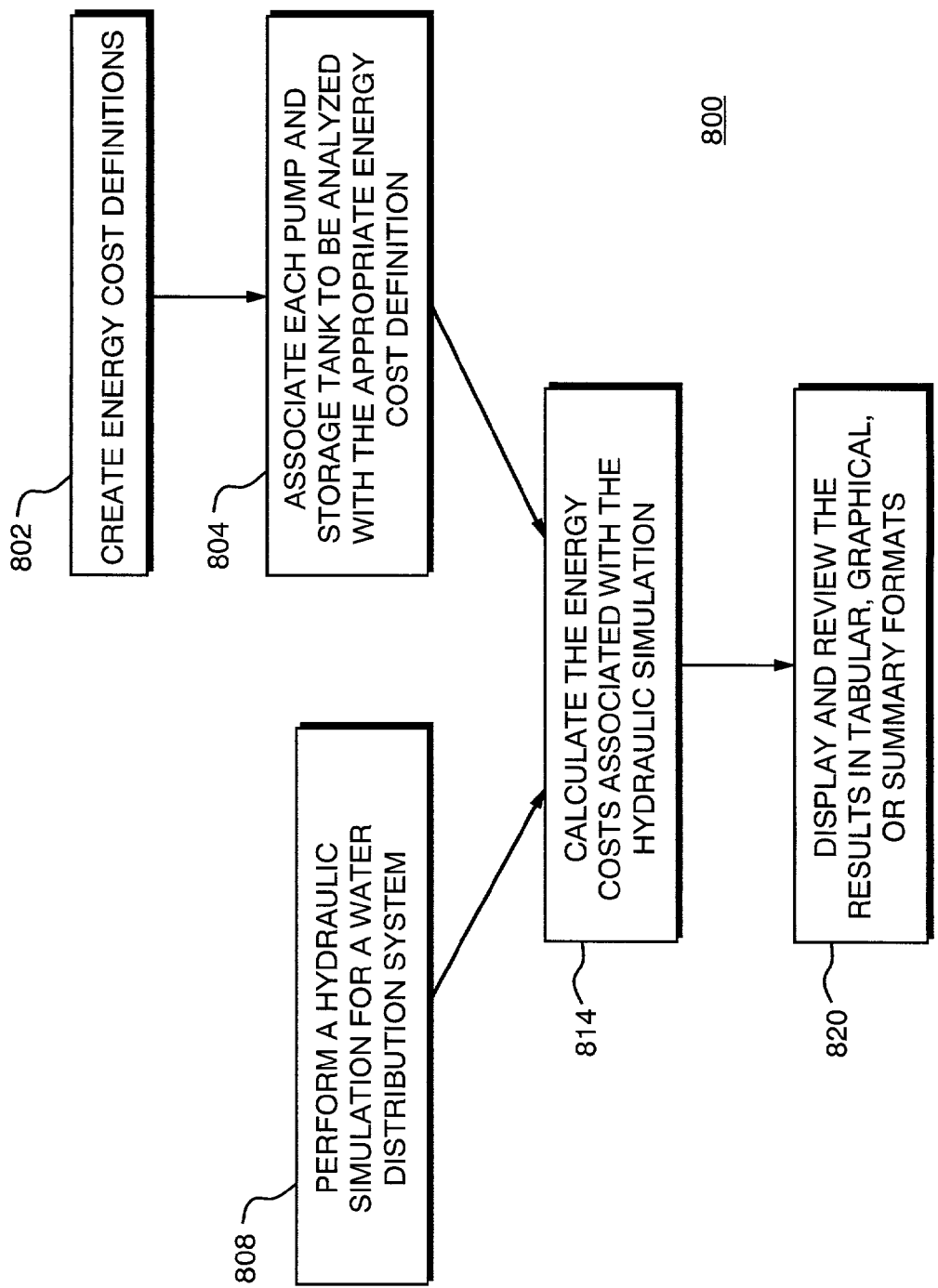
FIG. 8 is a flow chart illustrating the steps of the present invention.

The method of the present invention includes using an energy price definition that is appropriate for the time selected to be analyzed, and incorporating in the energy price definition a cost credit to account for water already in the storage tank. The method of the present invention is illustrated in the procedure 800 of the flow chart of FIG. 8. The tanks are not actually associated with an energy cost definition—only pumps are. Instead, tank cost is based on the average cost of pumping per unit volume ($/gallon, for example), as determined by the total cost of pumping divided by the total volume pumped. The change in tank volume is then multiplied by this cost per volume to obtain the net cost of the tank storage change. The program starts with the Energy Cost Definitions being created at step 802. As noted herein, the user enters the costs and demand charges for the relevant time period for the system. Next, each pump to be analyzed is associated with the appropriate Energy Cost Definition, as illustrated in step 804. For example, the illustrative system includes the two pumps, PMP-343 and PMP-345 and the storage tank T-215. Each pump has associated therewith an energy price definition. One pump may be, for example, associated with one energy provider and another component may be supplied with electricity by a different energy provider and thus the pricing structures are different and this information is entered into the energy pricing manager at GUI 600 (FIG. 6). A simulation of the system is run as illustrated in step 808, which will calculate the pump requirements for a system over the course of a simulation under the scenario that has been selected. That will produce the pump usage, and thus the energy usage during that time, and the pricing structure which has been included in the energy pricing editor 600 will then be employed to calculate the cost associated with the simulation, step 814. The results are produced and displayed in the user selected format, such as in a graph format or a tabular format or perhaps a schematic illustration of the water distribution network with color-coding to indicate flows and higher energy usages, as illustrated in step 820.

Using the information developed by the procedure 800 of the present invention, a user can estimate the costs associated with system operation and can manage system operation with energy efficiency in mind. For example, when a storage tank is to be refilled using pump energy, it may be determined to operate that pump at a time when there is not peak usage of, for example, other pumps in the system and at a time when the energy cost is not at a peak level as set by the relevant utility. Many alternatives can be tested using the method of the present invention in order to determine the most energy-efficient manner of operating an existing system, or perhaps the most energy-efficient method of designing a new system or a portion of the system, and as the cost calculations normalize all costs to a common time frame, then the comparisons are more accurate.

The foregoing description has been directed to specific embodiments of the invention. It will be apparent, however, that other variations and modifications may be made to the described embodiments with the attainment of some or all of the advantages of such. Therefore, it is the object of the appended claims to cover all such variations and modifications as come within the true spirit and scope of the invention.

What is claimed is:

1. A computer readable medium for estimating costs associated with the energy requirements of a water distribution system, comprising program instructions for performing the steps of:
   (A) defining the system components to be analyzed;
   (B) selecting a time interval over which costs are analyzed;
   (C) defining an energy cost definition describing the energy prices existing for each component in the system by assigning an energy price for the particular time interval selected;
   (D) performing a hydraulic simulation of the operation of the water distribution system to determine energy requirements of the system over the course of the simulation;
   (E) using the energy requirements determined in the hydraulic simulation, calculating energy costs associated with the energy requirements of the simulated water distribution system for the selected time interval, the calculating of energy costs based in part on a credit or a charge for changes in a level in a storage tank, wherein
      a credit represents a future savings if a final level in the storage tank at the end of the selected time interval exceeds an initial level in the storage tank at the start of the selected time interval; and
      a charge represents future expenditure to refill the storage tank to the initial level if the final level is less than the initial level; and
   (F) displaying the energy costs to a user.

2. The computer readable medium as defined in claim 1 comprising program instructions for performing the further steps of:
   calculating:
      (i) the cost of operating each component in the simulated water distribution system over the selected time interval; and
      (ii) the peak demand charge equivalent for that time interval.

3. The computer readable medium is defined in claim 1, comprising program instructions for performing the further step of calculating the cost equivalent of energy requirements associated with the operation of pumps that produce changes in water storage volume for storage tanks of the system to be analyzed.

4. The computer readable medium as defined in claim 1, comprising program instructions for performing the further steps of assigning a daily energy price as the energy usage cost divided by the selected time interval and using the assigned energy price when calculating cost estimates for a time period that includes the selected time interval.

5. The computer readable medium as defined in claim 1, comprising program instructions for performing the further step of incorporating peak demand charges and dividing the peak demand charge by the days in a billing cycle to determine the peak demand charge per day, where one day is the selected time interval.

6. The computer readable medium as defined in claim 1 comprising program instructions for performing the further steps of normalizing costs to a common time period.

7. The computer readable medium as defined in claim 1, wherein said defining an energy cost definition-step includes associating each pump to be analyzed with an appropriate energy cost definition, wherein a first pump is associated with a first energy cost definition and a second pump is associated with a second different energy cost definition.

8. The computer readable medium as defined in claim 1 comprising program instructions for performing the further step of displaying the results of said energy cost calculation in at least one of tabular, graphical and summary formats.

9. The computer readable medium as defined in claim 7 comprising program instructions for performing the further step of calculating as said energy cost results at least one of the following:
   (A) pump usage cost for the duration of the simulation;

(B) pump demand charge per billing period;
(C) tank storage cost or credit for the duration of the simulation;
(D) pump usage cost for a duration of one day;
(E) pump demand charge for a duration of one day;
(F) tank storage cost or credit for a duration of one day; and
(G) total energy cost for a duration of one day.

10. The computer readable medium as defined in claim 1 comprising program instructions for performing the further step of computing the average cost of pumping per unit volume and determining an average cost of pumping per unit volume and incorporating in the energy price definition a cost credit to account for water already in the storage tank.

11. The computer readable medium as defined in claim 10 comprising program instructions for performing the further step of determining a total cost of pumping divided by the total volume pumped, and the change in tank volume is then multiplied by cost per volume to obtain the net cost of the tank storage change.

12. The computer readable medium as defined in claim 1 including program instructions for performing the step of calculating the most energy efficient manner of operating an existing system over a particular time period.

13. The computer readable medium as defined in claim 1 including program instructions for performing the further step of including in said cost definition, a pricing structure associated with an energy provider of a particular selected component in the system.

14. The computer readable medium as defined in claim 1 wherein the initial level is associated with an initial volume of water retained within the storage tank and the final level is associated with a final volume of water retained within the storage tank.

15. A method for estimating costs associated with the energy requirements of a water distribution system, comprising:
   defining a model of the water distribution system in a modeling program, the model including representations of a plurality of water distribution system components, at least one of which is a storage tank;
   selecting a time interval over which costs are analyzed;
   defining an energy cost definition describing energy prices for the selected time interval;
   performing a hydraulic simulation of the model to determine energy requirements over the selected time interval;
   based on the hydraulic simulation, calculating energy costs associated with the energy requirements for the selected time interval, the calculation of energy costs combining costs of electrical energy used during the selected time interval and a credit or a charge based upon changes in a level in a storage tank during the selected time interval, wherein
      a credit represents a future savings if a final level in the storage tank at the end of the selected time interval exceeds an initial level in the storage tank at the start of the selected time interval, and
      a charge represents a future expenditure needed to refill the storage tank to the initial level if the final level is less than the initial level; and displaying energy costs to a user.

16. The method as defined in claim 15 wherein the step of calculating energy costs further comprises:
   calculating a peak demand charge equivalent for the selected time interval; and
   using the peek demand charge equivalent in calculating energy costs.

17. The method as defined in claim 15 further comprising:
   normalizing energy costs to a common time period.

18. The method as defined in claim 15 wherein the step of defining an energy cost definition further comprises:
   associating each of two or more pumps with an appropriate energy cost definition, wherein a first pump is associated with a first energy cost definition and a second pump is associated with a second different energy cost definition.

19. The method as defined in claim 15 wherein the step of displaying further comprises:
   presenting the energy costs in at least one of tabular, graphical and summary formats.

20. The method as defined in claim 15 wherein the initial level is associated with an initial volume of water retained within the storage tank and the final level is associated with a final volume of water retained within the storage tank.

* * * * *